L. HOLT.
MILKING MACHINE.
APPLICATION FILED JULY 16, 1908.
924,229.
Patented June 8, 1909.
2 SHEETS—SHEET 1.
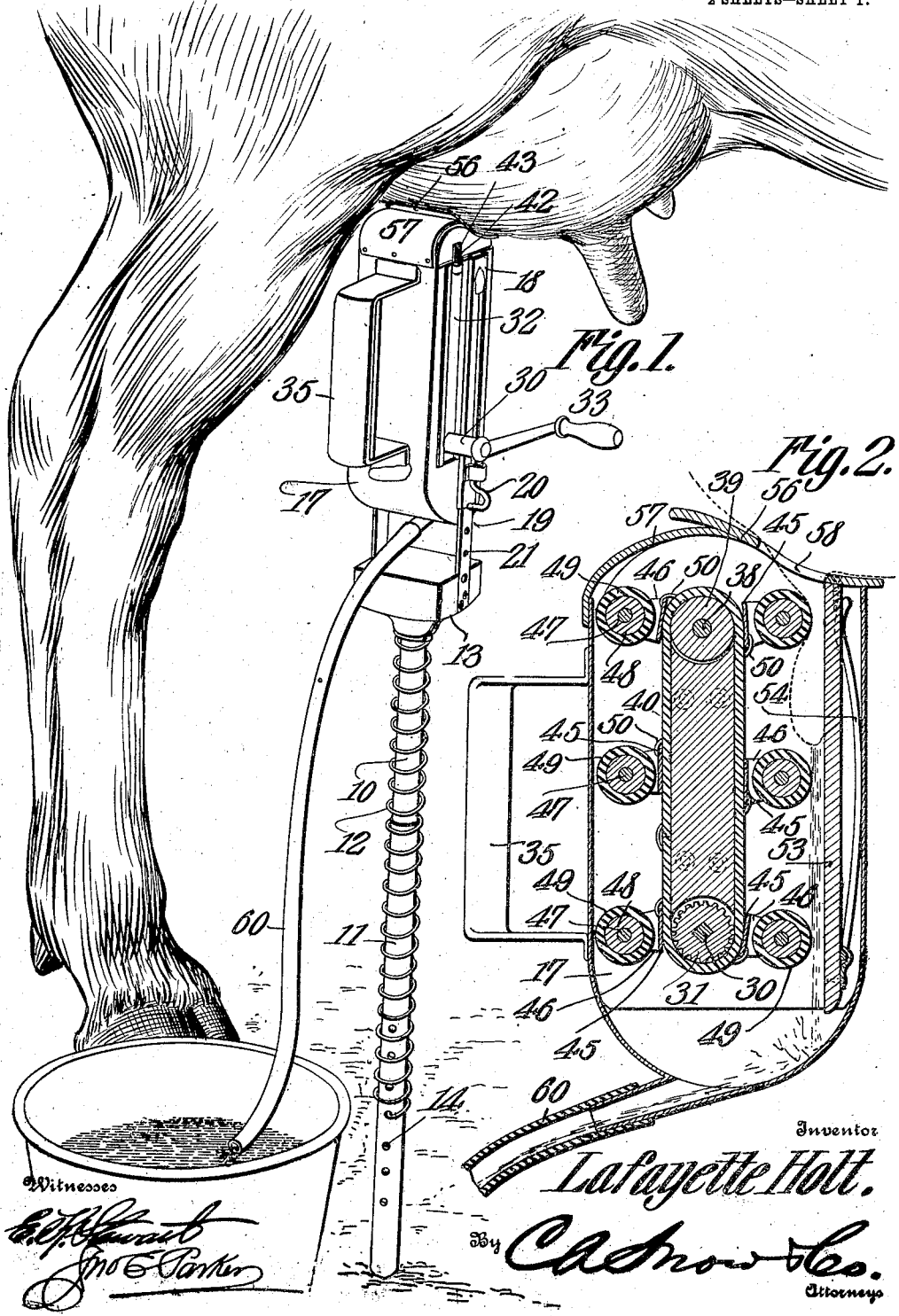

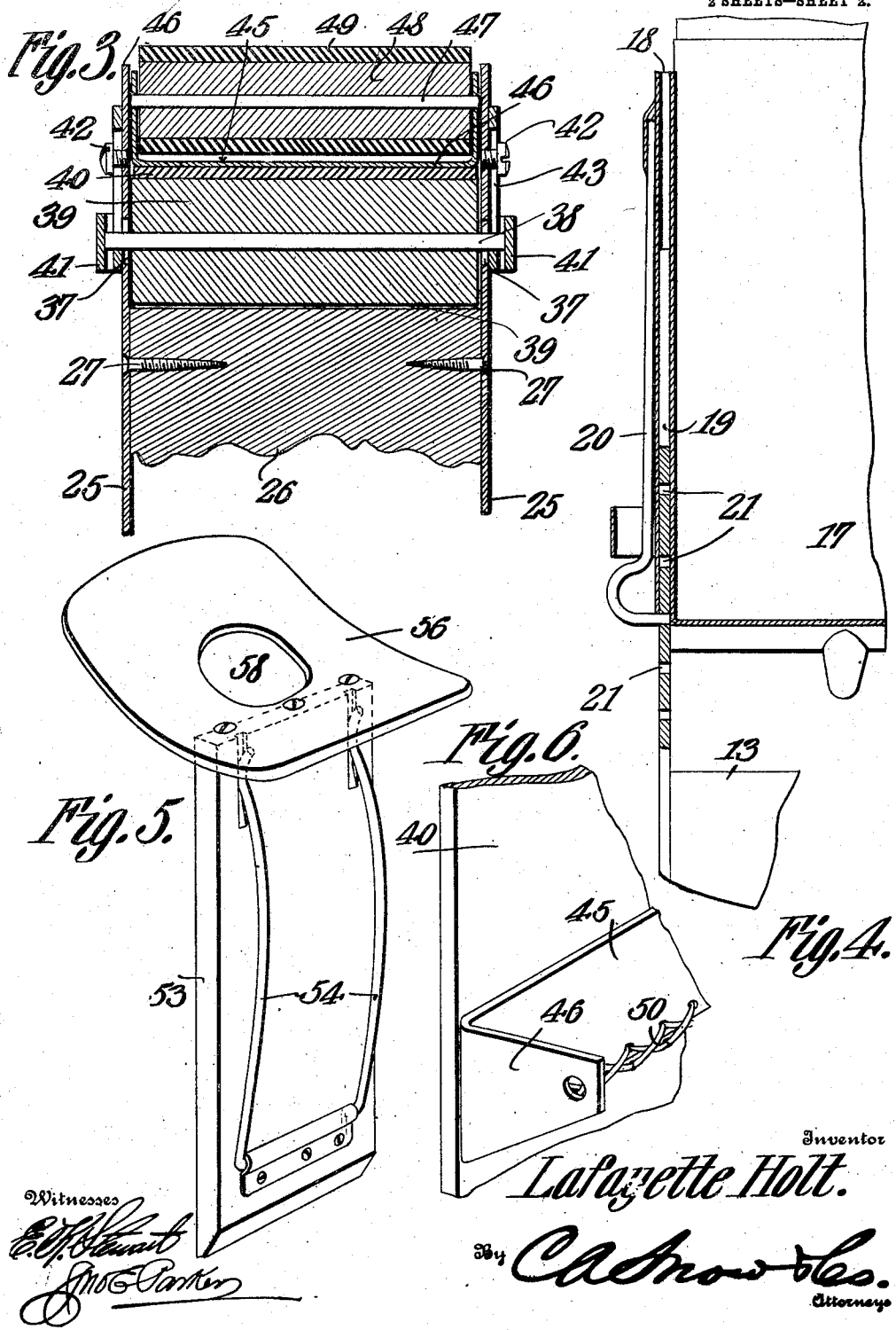

UNITED STATES PATENT OFFICE.

LAFAYETTE HOLT, OF BURLINGTON, NORTH CAROLINA.

MILKING-MACHINE.

No. 924,229.      Specification of Letters Patent.      Patented June 8, 1909.

Application filed July 16, 1908. Serial No. 443,854.

*To all whom it may concern:*

Be it known that I, LAFAYETTE HOLT, a citizen of the United States, residing at Burlington, in the county of Alamance and State of North Carolina, have invented a new and useful Milking-Machine, of which the following is a specification.

This invention relates to cow milking machines and has for its principal object to provide a mechanism of simple construction whereby the milk may be withdrawn from the animal by the exercise of gradual pressure lengthwise of the teat thus imitating the natural action of the calf.

A further object of the invention is to provide a machine of this type which may be movably supported against the udder of the cow, and which may be manipulated at any speed for the purpose of withdrawing the milk.

A still further object of the invention is to provide a device of this character in which the milk is drawn into a closed receptacle adjacent the udder and so elevated that the milk may flow by gravity through a conveying tube to a pail located at a safe distance.

A still further object of the invention is to provide a machine of this type which may be readily adjusted to suit the height of different animals, and further to so arrange the interior mechanism as to permit its ready removal so that the elevated vessel may be used as a receptacle for milk withdrawn by hand.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a cow milking machine constructed in accordance with the invention. Fig. 2 is a sectional elevation of the upper portion of the same. Fig. 3 is a vertical section at a right angle to Fig. 2 being drawn to an enlarged scale. Fig. 4 is a detail sectional view through one of the vertically adjustable supports. Fig. 5 is a detail perspective view of the removable pressure plate. Fig. 6 is a detail view of one of the roller supporting brackets.

Similar numerals of reference are employed to indicate corresponding parts throughout the several figures of the drawings.

The machine proper is supported on a telescopic standard comprising an upper rod 10 and a tube 11 arranged for the reception of the rod. Surrounding the standard is a helical compression spring 12 the upper end of which bears against a block 13 at the top of the rod while the lower end of the spring is arranged to fit within any one of a series of openings 14 formed in the tube to permit adjustment of the height of the standard and the stress exerted by the spring.

Arranged above the block 13 is a casing 17 the opposite sides of which are provided with vertical guides 18 that are arranged for the reception of vertical bars 19. The lower ends of the bars are permanently secured to the opposite sides of the block and the casing may be raised and lowered on the bars for the purpose of securing the desired vertical adjustment, and then locked in place by a spring tongue 20 that is carried at one side of the casing and is arranged to enter openings 21 formed in one of the side bars 19.

The casing is arranged for the reception of a removable frame comprising a pair of side plates 25 which are permanently connected by a spacing block 26 and securing screws 27 as shown in Fig. 3. In the lower portion of the frame plates are bearing openings for the reception of a shaft 30 carrying a roller 31 that is provided with a ribbed or toothed periphery. The shaft 30 extends out through a vertical slot 32 formed in one wall of the casing, and may be operated from any suitable source of power, a handled operating crank 33 being shown in the present instance and this is grasped by the right hand of the operator while the left hand grasps a steadying or supporting handle 35 that is secured to the outer wall of the casing proper.

In the upper portion of each of the frame plates 25 is a vertical slot 37 arranged for the passage of the end portions of a shaft 38. This shaft carries a roller 39, and over the two rollers 31 and 39 passes a belt 40 formed of any suitable material. The opposite ends of the shaft 38 are mounted in bearings formed in brackets 41 that are supported by screws 42 passing through slots 43 in the brackets, the construction being such as to permit adjustment of the distance between the rollers 39 and maintain the belt taut.

Mounted on the belt are brackets 45 each in the form of a metallic plate the opposite ends of which are turned to form ears 46 that are perforated for the reception of small spindles 47 and these spindles carry teat engaging rollers 48 that are provided with coverings 49 formed of some yieldable material. The brackets are connected with the belt at intervals and preferably by loose connections such as stitchings or the like, as indicated at 50, the stitches pass through the belt and through the openings formed in the plates as shown in Fig. 6 so that when necessary the brackets may be readily removed and a larger or smaller number employed and spaced at different distances from each other to suit the physical characteristics of the animal.

Hung loosely within the casing is a yieldable pressure plate 53 that is arranged at one side of the descending run of the belt, and which is normally pressed toward the rollers on this side of the belt by means of one or more springs 54, the springs being preferably secured to the outer face of the plate and being removable therewith. To the upper edge of the plate is secured a flexible guard 56 which in connection with a flexible flap 57 forms a covering for the top of the casing and the edge of this covering rests on the upper edges of the frame plates 25, the latter being curved in the manner shown in Figs. 1 and 2 in order to fit snugly against the udder. In the guard plate 56 is an opening 58 through which the teat is introduced, or by slightly increasing the size of the machine the plate may have two openings for the reception of two teats at the same time.

In operation the machine is adjusted to position beneath the udder and lifted up into place the teat being introduced through the opening 58 and the top of the machine held yieldably against the udder. The operator grasps the steadying handle 35 in the left hand and manipulates the crank 33 with the other hand, the belt 40 is moved and the rollers 48 are brought successively into engagement with the base of the teat forcing the same against the pressure plate 53. The roller sweeps down the side of the teat from the base to the end, and when one roller moves from engagement with the teat the following roller strikes against the base so that there is alternate squeeze and release continuing through the length of the teat in imitation of the natural action of the calf and as usually practiced in hand milking. The milk flows down to the bottom of the casing and thence is conducted away by a tube 60 to a milk pail or other receptacle.

In cases where it is impracticable to use the pressure rollers the roller carrying frame and the plate may both be lifted out from the top of the receptacle and the latter held up in position for the purpose of receiving the milk as it is withdrawn by the right hand of the operator.

As all of the working parts may be readily removed there is but little difficulty in properly cleansing the same and thus maintaining the apparatus in hygienic condition.

What is claimed is:—

1. In milking apparatus, a casing, a pressure plate detachably supported within the casing, a yieldable covering secured to the upper edge of the plate and provided with a teat receiving opening, a frame mounted loosely in the casing, rolls supported by the frame, a belt extending over said rolls, said belt being backed by the frame and held from inward movement, and teat engaging pressure rollers carried by said belt.

2. In a cow milking apparatus, a casing, a removable frame arranged within the casing said frame having a pair of vertical slots, an operative shaft journaled in the frame, a driving roller on the shaft, a second roller, a shaft carrying the same and extending through the slots, adjustable brackets forming bearings for the support of said second shaft, a flexible belt guided by the rollers, pressure rollers supported by the belt, a closing flap carried by the casing and arranged to extend over a portion of the open top of the same, a pressure plate detachably mounted within the casing, springs secured to the plates and engaging against the inner wall of the casing, and a guard carried by said plate and provided with a teat receiving opening.

3. In a cow milking apparatus, teat engaging members, a casing supporting the same, and an elevating spring for yieldably holding the apparatus against the udder, said spring being adjustable as to its tension irrespective of the height of the apparatus.

4. In a cow milking apparatus, a teat engaging member, a supporting standard, and a spring tending to elevate the teat engaging member and hold the same yieldably against the udder, said spring being adjustably connected to the standard to vary its tension.

5. In a cow milking apparatus, a teat engaging member, a telescopic supporting standard therefor, and a spring tending to separate the sections of the standard and hold the device yieldably against the udder, said standard having means for the adjustment of the tension of the spring.

6. In apparatus of the class described, a telescopic standard, the tubular member of the standard having a series of openings, a spring encircling the standard and having one end adapted to fit within any one of the openings, a block secured to the upper end of the standard and against which the spring bears, a pair of bars secured to said block one of the said bars having a series of openings, a casing having guides for the reception of the bars, a spring latch carried by the casing and arranged to engage in any one of the bar openings, and locking means within the casing.

7. In apparatus of the class described, a yieldably supported casing arranged to engage against the udder, and a discharge tube leading from the lower portion of the casing, and a steadying handle for the entire casing.

In testimony that I claim the foregoing as my own, I have hereto affixed my signature in the presence of two witnesses.

LAFAYETTE HOLT.

Witnesses:
A. C. MITCHELL,
G. W. HOFMAN.